United States Patent [19]

Asplund et al.

[11] 4,047,559
[45] Sept. 13, 1977

[54] REGENERATIVE AIR PREHEATER INSTALLATION

[75] Inventors: Frank Eskil William Asplund; Axel Erik Konstantin Engstrom, both of Jarfalla, Sweden

[73] Assignee: AB Svenska Maskinverken, Jarfalla, Sweden

[21] Appl. No.: 631,022

[22] Filed: Nov. 12, 1975

[30] Foreign Application Priority Data

Dec. 6, 1974 Sweden ............................... 7415304

[51] Int. Cl.$^2$ ............................................ F28D 19/00
[52] U.S. Cl. ........................................... 165/7; 165/9
[58] Field of Search ...................................... 165/7, 9

[56] References Cited

U.S. PATENT DOCUMENTS

| 2,681,209 | 6/1954 | Mudersbach | 165/7 |
| 2,892,616 | 6/1959 | Firgau | 165/7 |

FOREIGN PATENT DOCUMENTS

| 1,139,897 | 7/1957 | France | 165/7 |
| 1,106,348 | 5/1961 | Germany | 165/7 |

Primary Examiner—Albert W. Davis, Jr.
Attorney, Agent, or Firm—Sughrue, Rothwell, Mion, Zinn and Macpeak

[57] ABSTRACT

A regenerative air preheater is disclosed comprising a heat exchanger including a power operated rotary heat exchanging unit and a surrounding stationary casing having opposite inlets and outlets for combustion air and flue gas defining two axial passageways for combustion air and flue gas, respectively, through the rotary heat exchanging unit, each such passageway being connected with its inlet and outlet in a duct for conveying a flow of combustion air or flue gas, respectively, through the heat exchanger, means being provided to conduct away from the flue gas outlet of the heat exchanger at least a major portion of any air passing from the combustion air passageway to the flue gas passageway during operation of the heat exchanger, and a branch duct being connected to the flue gas duct at a point located after the heat exchanger, as viewed in the direction of flow of flue gas through the flue gas duct, in order to allow flue gas to be drawn off from the flue gas duct for subsequent use as an inert gas.

2 Claims, 2 Drawing Figures

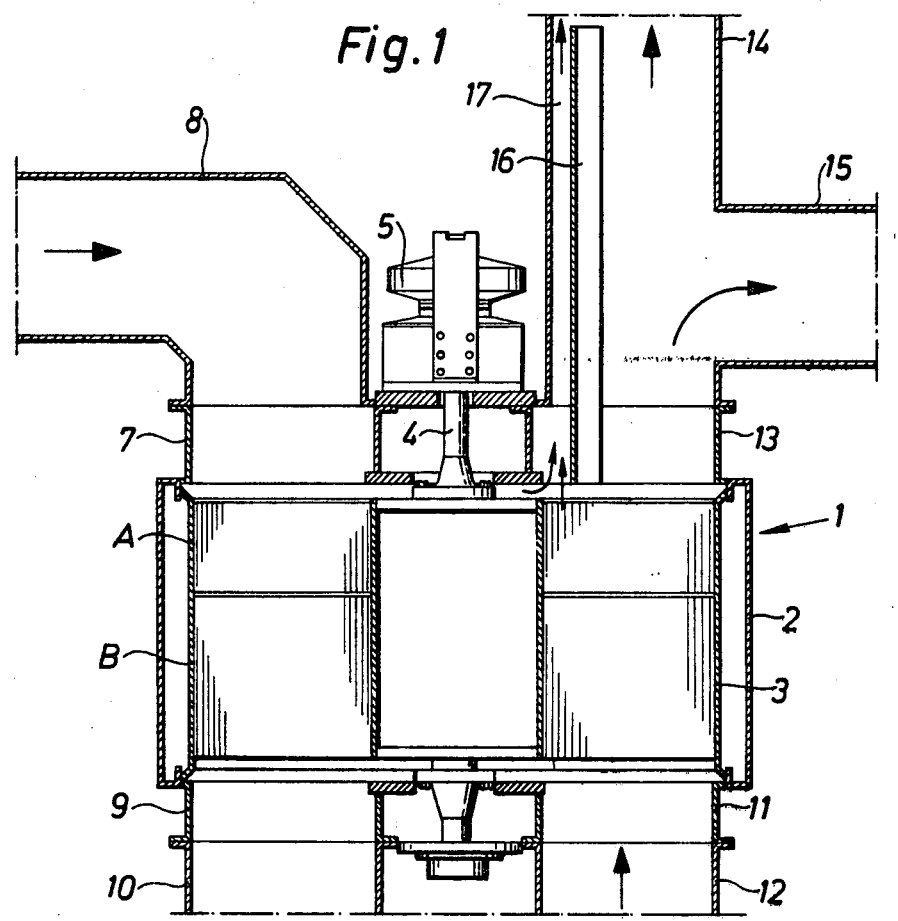
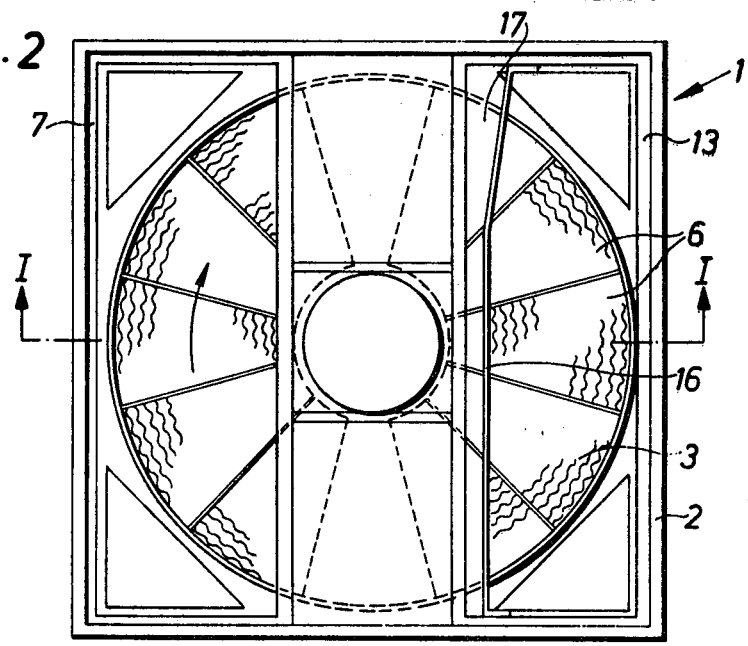

REGENERATIVE AIR PREHEATER INSTALLATION

The present invention relates to a regenerative air preheater installation of the kind comprising a heat exchanger including a generally cylindrical rotary heat exchanging unit, connected to a driving motor and allowing fluids to flow therethrough in directions generally parallel to its rotary axis, and a stationary casing which surrounds the heat exchanging unit and is provided with axially opposite inlets and outlets for combustion air and flue gas defining two axial passageways for combustion air and flue gas, respectively, extending through the rotary heat exchanging unit, each such passageway being connected with its inlet and outlet in a duct for conveying a flow of combustion air and flue gas, respectively, through the heat exchanger, the flue gas duct having a branch duct connected thereto to allow flue gas to be drawn off from the flue gas duct through said branch duct for subsequent use as an inert gas.

Hitherto, the branch duct utilized for drawing off flue gas from the flue gas duct for use as an inert gas has always been connected to the flue gas duct at a point located before the air preheater as viewed in the direction of flow of flue gas through the flue gas duct, although such a location of the branch duct connection causes evident disadvantages. When, in this manner, inert gas is derived from the flue gas duct by drawing of flue gas from said duct at a point located before the heat exchanger the amount of flue gas passing through the heat exchanger will be reduced in proportion to the amount of inert gas drawn off from the flue gas duct. Obviously, this means that the amount of heat that may be obtained from the flue gas and transmitted to the combustion air within the heat exchanger is correspondingly reduced. This fact, in turn, results in a reduction of the total efficiency of the plant in which the air preheater is connected. Additionally when inert gas is drawn off from the flue gas duct before the air preheater, the risk for corrosion within the air preheater will be considerable and the rate of corrosion in the smoke stack of chimney to which the flue gas duct is connected will increase. Finally, the inert gas so derived from the flue gas duct will have a high temperature, whereby a heat exchanger having a large capacity will be required for subsequently cooling the inert gas.

The reason why the inert gas duct, or branch duct, has nevertheless been connected to the flue gas duct before the air preheater and not after the same is to be found in the flow of air from the combustion air passageway to the flue gas passageway that occurs within the heat exchanger, on the one hand as a result of leakage, and on the other hand, due to the fact that a certain amount of air will be carried from the combustion air passageway to the flue gas passageway by the rotating heat exchanging unit. This means that the portion of the flue gas duct located after the heat exchanger will necessarily contain not only flue gas but also a certain quantity of air. Accordingly, it has not been possible previously to connect the inert gas duct to said portion of the flue gas duct, since the mixture of air and flue gas contained therein cannot replace an inert gas. For instance, if such an air and flue gas mixture was fed in place of an inert gas to an oil tank it would result in a high explosion risk.

The invention has for its object to provide an improved air preheater installation of the kind initially specified which avoids the drawbacks above accounted for. In accordance with the invention there is provided a regenerative air preheater installation of said kind which is characterized in that means are provided to conduct away from the flue gas outlet of the heat exchanger at least a major portion of any air passing from the combustion air passageway to the flue gas passageway during the operation of the heat exchanger, said branch duct being connected to the flue gas duct at a point located after the heat exchanger, as viewed in the direction of flow of flue gas through the flue gas duct.

Said means may suitably be arranged to define a passageway, through which air may be conducted away from the flue gas outlet of the heat exchanger to a point in the flue gas duct located after the branch duct connection.

In a preferred embodiment of the invention said means include a shield inserted in the flue gas outlet and extending into the adjoining portion of the flue gas duct and past the branch duct connection to define an air passageway in the portion of the flue gas duct located closest to the combustion air duct.

Below the invention will be described in further detail, reference being had, by way of example, to the accompanying diagrammatic drawing in which:

FIG. 1 shows a vertical section according to line I—I in FIG. 2 through a regenerative air preheater having ducts for combustion air and flue gas connected thereto, while FIG. 2 shows a plan view of the air preheater of FIG. 1 with said ducts removed.

In the drawing, reference numeral 1 generally designates an air preheater for a boiler. Said air preheater consists of a heat exchanger of Ljungstrom-type comprising a casing or enclosure 2 having a substantially rectangular configuration, and a generally cylindrical heat exchanging unit 3 rotatably mounted within casing 2. By means of a shaft 4, the rotor formed by unit 3 is connected to a driving motor 5 which may cause unit 3 to rotate at a comparatively low speed. The heat exchanging unit 3 is composed of a plurality of detachable segments 6. In FIG. 1, said segments are arranged in two superposed layers A and B. Each segment 6 includes a large number of upstanding thin metal plates which are configured and arranged to permit fluids to pass in axial directions through the various segments in effective heat exchange with said plates.

At its upper end casing 2 is provided with an air inlet 7 to which an incoming duct 8 for combustion air is connected. Opposite to inlet 7 casing 2 has at its lower end an air outlet 9 to which an outgoing duct 10 for combustion air is connected. On the opposite side with respect to the rotary axis of the heat exchanging unit 3 casing 2 has at its lower end a flue gas inlet 11 and a connected incoming duct 12 for flue gas. At the upper end of casing 2 and in alignment with the flue gas inlet 11 a flue gas outlet 13 is provided to which an outgoing duct 14 for flue gas is connected.

At a short distance from the lower end of duct 14 a branch duct 15 is connected to permit inert gas to be delivered from duct 14 to an oil tank or other usage station. Reference numeral 16 designates a shield mounted in duct 14 and projecting into the flue gas outlet 13 of the air preheater and extending within duct 14 to a level at some distance above branch duct 15. Shield 16 cooperates with the adjacent wall of duct 14 to define a passageway 17 which serves to divert from the flue gas outlet 13 any air passing within the heat exchanger from the combustion air passageway formed between inlet 7 and outlet 9 to the flue gas passageway extending between inlet 11 and outlet 13. Such an air flow may occur on the one hand as a result of leakage at the upper end of the heat exchanging unit 3 and on the other hand due to the carrying action that the rotary unit 3 will have on the combustion air during the passage of said air through unit 3. The desired transport of air and any accompanying flue gas through passageway 17 may be intensified through ejector action or by mounting a fan in said passageway.

The invention is not restricted to the embodiment above described and illustrated in the drawing. Instead, many modifications are possible within the scope of the invention. For instance, passageway 17 may be replaced by a separate duct located externally of duct 14.

What we claim is:

1. In a regenerative air preheater installation of the kind comprising a heat exchanger including a generally cylindrical rotary heat exchanging unit, connected to a driving motor and allowing fluids to flow therethrough in directions generally parallel to its rotary axis, and a stationary casing which surrounds the heat exchanging unit and is provided with axially opposite inlets and outlets for combustion air and flue gas defining two axial passageways for combustion air and flue gas, respectively, extending through the rotary heat exchanging unit, each such passageway being connected with its inlet and outlet in a duct for conveying a flow of combustion air and flue gas, respectively, through the heat exchanger, a branch duct connected to the flue gas duct to allow flue gas to be drawn off from the flue gas duct through said branch duct for subsequent use as an inert gas, the improvement comprising means to conduct away from the flue gas outlet of the heat exchanger at least a major portion of any air passing from the combustion air passageway to the flue gas passageway during the operation of the heat exchanger, said branch duct being connected to the flue gas duct at a point located downstream of the heat exchanger, as viewed in the direction of flow of flue gas through the gas duct, and means defining a passageway through which air may be conducted away from the flue gas outlet of the heat exchanger to a point in the flue gas duct located downstream of the branch duct connection.

2. A regenerative air preheater installation according to claim 1, wherein said passageway defining means includes a shield inserted in the flue gas outlet and extending into the adjoining portion of the flue gas duct and past the branch duct connection to define an air passageway in the portion of the flue gas duct located closest to the combustion air duct.

* * * * *